United States Patent
Osako et al.

(10) Patent No.: US 8,091,394 B2
(45) Date of Patent: Jan. 10, 2012

(54) FOREIGN PIPE OR TUBE DETERMINING METHOD

(75) Inventors: Hajime Osako, Osaka (JP); Takeshi Maekawa, Osaka (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 12/738,103

(22) PCT Filed: Nov. 26, 2008

(86) PCT No.: PCT/JP2008/071366
§ 371 (c)(1),
(2), (4) Date: Aug. 20, 2010

(87) PCT Pub. No.: WO2009/122613
PCT Pub. Date: Oct. 8, 2009

(65) Prior Publication Data
US 2010/0300167 A1    Dec. 2, 2010

(30) Foreign Application Priority Data

Mar. 31, 2008 (JP) .................................. 2008-090819

(51) Int. Cl.
*B21B 37/00* (2006.01)
*G06F 19/00* (2011.01)

(52) U.S. Cl. ........ 72/11.1; 72/11.6; 72/365.2; 72/367.1; 700/149

(58) Field of Classification Search ...................... 72/7.6, 72/8.3, 8.4, 8.9, 11.1, 11.6, 12.7, 12.8, 97, 72/208, 209, 365.1, 366.2, 367.1, 368, 370.25, 72/365.2; 700/148, 149

See application file for complete search history.

(56) References Cited

U.S. PATENT DOCUMENTS

| | | | | | |
|---|---|---|---|---|---|
| 3,496,745 | A | * | 2/1970 | Kooks | 72/12.7 |
| 4,397,169 | A | * | 8/1983 | Staat | 72/9.2 |
| 4,506,531 | A | * | 3/1985 | Sakurada et al. | 72/8.5 |
| 5,119,109 | A | * | 6/1992 | Robertson | 347/2 |

FOREIGN PATENT DOCUMENTS

| | | | |
|---|---|---|---|
| JP | 60-21114 | * | 2/1985 |
| JP | 60-137516 | * | 7/1985 |
| JP | 3-138008 | * | 6/1991 |
| JP | 6-39412 | * | 2/1994 |
| JP | 7-246423 | | 9/1995 |
| JP | 8-10817 | * | 1/1996 |
| JP | 2001-153843 | | 6/2001 |
| JP | 2004-34048 | | 2/2004 |
| SU | 1539004 | * | 1/1990 |

* cited by examiner

*Primary Examiner* — Edward Tolan
(74) *Attorney, Agent, or Firm* — Clark & Brody

(57) ABSTRACT

There is provided a foreign pipe or tube determining method capable of accurately determining a foreign pipe or tube. The foreign pipe or tube determining method in accordance with the present invention includes a step for determining the presence of a foreign pipe or tube by comparing the length of each pipe or tube in a size measuring step with the length of each pipe or tube measured in an actual weighing and length measuring step, which is associated with each pipe or tube in the size measuring step, a step for determining the presence of a foreign pipe or tube by comparing the weight of each pipe or tube calculated in a weight calculating step with the weight of each pipe or tube measured in the actual weighing and length measuring step, which is associated with each pipe or tube in a weight calculating step, and a step for determining the presence of a foreign pipe or tube based on the material of each pipe or tube determined in a material determining step.

2 Claims, 4 Drawing Sheets

FOREIGN PIPE OR TUBE DETERMINING METHOD

TECHNICAL FIELD

The present invention relates to a foreign pipe or tube determining method capable of accurately determining whether a foreign pipe or tube is present or not. Hereinafter, "pipe or tube" is referred to as "pipe" when deemed appropriate.

BACKGROUND ART

In manufacturing seamless pipes using the Mannesmann-mandrel mill process, billets, which are raw materials, are heated first in a rotary hearth type heating furnace, and then are supplied to a rolling line one after another. Specifically, each of the billets is subjected to piercing-rolling by using a piercer plug and a rolling roll in a piercing rolling mill to produce a hollow shell. Next, a mandrel bar is inserted into the hollow shell in a spit form, and the hollow shell is drawn and rolled by a mandrel mill provided with a plurality of rolling stands with the outer surface thereof being restrained by a grooved roll to reduce the wall thickness thereof to a predetermined thickness. Thereafter, the mandrel bar is removed, and the hollow shell whose wall thickness has been reduced is subjected to sizing to size to a predetermined outside diameter by using a sizing mill provided with a plurality of rolling stands, whereby a pipe is obtained. For the pipe thus rolled, the weight and length thereof are measured in an actual weighing and length measuring step, and it is determined whether the weight and length are within a predefined tolerance.

In the process in which the rolled pipes are conveyed to the actual weighing and length measuring step (including a heat treating step and a cutting step), (1) a pipe having a different material, although having the same or substantially the same weight and length, in any other production lot may coexist. Also, (2) a pipe having different weight or length, although having the same material, in any other production lot may coexist. Further, (3) although pipes are within the same production lot, the pipes may be conveyed in the improper sequential order.

In view of the recent situation in which, in addition to the need for delivering pipes that meet customer's required specifications (material, length, weight), the demand for clarifying the production history of each pipe is increasing, it is desired to accurately determine the presence of any kinds of foreign pipes as described in items (1) to (3) (a pipe from any other production lot, and a pipe conveyed in the improper sequential order within the same production lot).

Conventionally, however, as described JP2001-153843A, the component analysis and the measurement of physical property values have mainly been used to determine the material of pipe, therefore the presence of a foreign pipe. This means that, among the foreign pipes of the above items (1) to (3), the presence of foreign pipe of item (1) has mainly been determined.

As described above, since it has conventionally been determined whether or not the weight and length of pipe measured in the actual weighing and length measuring step are within the predefined tolerance, an out-of-tolerance foreign pipe could be detected even if it is of item (2) or (3).

However, to take production variations into account, the above-described tolerance should inevitably be set at a large value to some degree. Therefore, a foreign pipe of the above items (2) and (3) having a weight or length close to that of the normal pipe may not be detected.

DISCLOSURE OF THE INVENTION

The present invention has been made in view of the above-described prior art, and accordingly an object thereof is to provide a foreign pipe or tube determining method capable of accurately determining a foreign pipe or tube (a pipe or tube from any other production lot, and a pipe or tube conveyed in the improper sequential order within the same production lot).

In order to solve the above-described object, the present invention provides a foreign pipe or tube determining method carried out in a pipe or tube production process including a rolling step and an actual weighing and length measuring step for measuring weight and length of each pipe or tube rolled in the rolling step, comprising the following steps of items (a)-(d).

(a) a size measuring step for measuring outside diameter, wall thickness, and length of each pipe or tube after the rolling step and before the actual weighing and length measuring step (b) a weight calculating step for calculating weight of each pipe or tube based on the outside diameter, wall thickness, and length of pipe or tube measured in the size measuring step (c) a material determining step for determining material of each pipe or tube after the rolling step (d) a foreign pipe or tube determining step for determining the presence of a foreign pipe or tube The foreign pipe or tube determining step of item (d) comprises the following steps of items (d1)-(d3).

(d1) a step for determining the presence of a foreign pipe or tube by comparing the length of pipe or tube measured in the size measuring step with the length of pipe or tube measured in the actual weighing and length measuring step, which is associated with the pipe or tube in the size measuring step (d2) a step for determining the presence of a foreign pipe or tube by comparing the weight of pipe or tube calculated in the weight calculating step with the weight of pipe or tube measured in the actual weighing and length measuring step, which is associated with the pipe or tube in the weight calculating step (d3) a step for determining the presence of a foreign pipe or tube based on the material of pipe or tube determined in the material determining step According to the present invention, the length of pipe or tube is measured for each pipe or tube after the rolling step and before the actual weighing and length measuring step (the size measuring step of item (a)). Then, the length of pipe or tube measured in this size measuring step is compared with the length of pipe or tube measured in the actual weighing and length measuring step, which is associated with the pipe or tube in the size measuring step, thereby determining the presence of a foreign pipe or tube (step of item (d1)).

In other words, in the present invention, the length of pipe or tube measured in the size measuring step is stored for each pipe or tube. The stored length of each of pipes or tubes is compared with the length measured in the actual weighing and length measuring step of a pipe or tube which is associated with each of the pipes or tubes by tracking or the like (i.e. recognized to be the same pipe or tube). At this time, for example, if the difference between both the lengths is out of a predefined range, it should be determined that a foreign pipe or tube coexists in a process between the size measuring step and the actual weighing and length measuring step (that is, the pipes or tubes whose lengths have been compared are different ones). The pipes or tubes whose lengths are compared are the same ones unless a foreign pipe or tube coexists. Therefore, production variations need not be taken into consideration in the above-described range, and the above-described range can be smaller than the tolerance conventionally set in the actual weighing and length measuring step. Therefore, the foreign pipes or tubes of the aforementioned items (2) and (3) can also be detected accurately as far as the lengths of the pipes or tubes being compared are different (as far as the difference being out of the above-described range).

Also, according to the present invention, the weight of pipe or tube is calculated for each pipe or tube based on the outside diameter, wall thickness, and length of pipe or tube measured in the size measuring step (the weight calculating step of item (b)). That is, since the volume of pipe or tube can be calculated from the measured outside diameter, wall thickness, and length of pipe or tube, the weight can be calculated by multiplying this volume by a preset density of pipe or tube. The weight of pipe or tube calculated in the weight calculating step is compared with the weight of pipe or tube measured in the actual weighing and length measuring step, which is associated with the pipe or tube in the weight calculating step, thereby determining the presence of a foreign pipe or tube (step of item (d2)).

In other words, in the present invention, the weight of pipe or tube calculated in the weight calculating step based on the outside diameter, wall thickness, and length of pipe or tube measured in the size measuring step is stored for each pipe or tube. The stored weight of each of pipes or tubes is compared with the weight measured in the actual weighing and length measuring step of a pipe or tube which is associated with each of the pipes or tubes by tracking or the like (i.e. recognized to be the same pipe or tube). At this time, for example, if the difference between both the weights is out of a predefined range, it should be determined that a foreign pipe or tube coexists in a process between the size measuring step and the actual weighing and length measuring step (that is, the pipes or tubes whose weights have been compared are different ones). The pipes or tubes whose weights are compared are the same ones unless a foreign pipe or tube coexists. Therefore, production variations need not be taken into consideration in the above-described range, and the above-described range can be smaller than the tolerance conventionally set in the actual weighing and length measuring step. Therefore, the foreign pipes or tubes of the aforementioned items (2) and (3) can also be detected accurately as far as the weight of the pipes or tubes being compared are different (as far as the difference being out of the above-described range).

The "weight of pipe or tube" is used as a concept including the weight per unit length of pipe or tube in addition to the weight of the overall length of pipe or tube.

Further, according to the present invention, the material of pipe or tube is determined for each pipe or tube after the rolling step (the material determining step of item (c)). Then, the presence of a foreign pipe or tube is determined based on the material of pipe or tube determined in the material determining step (step of item (d3)).

Therefore, like the conventional method, a foreign pipe or tube of the aforementioned item (1) can be detected.

As described above, according to the present invention, the presence of any kinds of foreign pipes or tubes as described in the aforementioned items (1) to (3) (a pipe or tube from any other production lot, and a pipe or tube conveyed in the improper sequential order within the same production lot) can be determined accurately.

Preferably, the size measuring step and the weight calculating step are carried out a plurality of times for each pipe or tube, and the foreign pipe or tube determining step further comprises the following steps of items (d4) and (d5).

(d4) a step for determining the presence of a foreign pipe or tube by comparing the length of pipe or tube measured in the preceding size measuring step with the length of pipe or tube measured in the following size measuring step, which is associated with the pipe or tube in the preceding size measuring step (d5) a step for determining the presence of a foreign pipe or tube by comparing the weight of pipe or tube calculated in the preceding weight calculating step with the weight of pipe or tube calculated in the following weight calculating step, which is associated with the pipe or tube in the preceding weight calculating step According to the above-described preferred mode, instead of determining the presence of a foreign pipe or tube by only the comparison with the length and weight of pipe or tube measured in the actual weighing and length measuring step, the presence of a foreign pipe or tube is determined by the comparison between the lengths of pipe or tube measured in a plurality of size measuring steps and the comparison between the weights of pipe or tube calculated in a plurality of weight calculating steps. Therefore, the accuracy of determining a foreign pipe or tube can be improved further.

According to the foreign pipe or tube determining method in accordance with the present invention, the presence of not only a foreign pipe or tube having a different material but also any kinds of foreign pipes or tubes can be determined accurately.

BEST MODE FOR CARRYING OUT THE INVENTION

Embodiments of the foreign pipe determining method in accordance with the present invention will now be described with reference to the accompanying drawings as appropriate.

First Embodiment

In the foreign pipe determining method in accordance with a first embodiment, a size measuring step is carried out only once between a rolling step for rolling a pipe and an actual weighing and length measuring step for measuring the weight and length of each rolled pipe.

Figure 1:
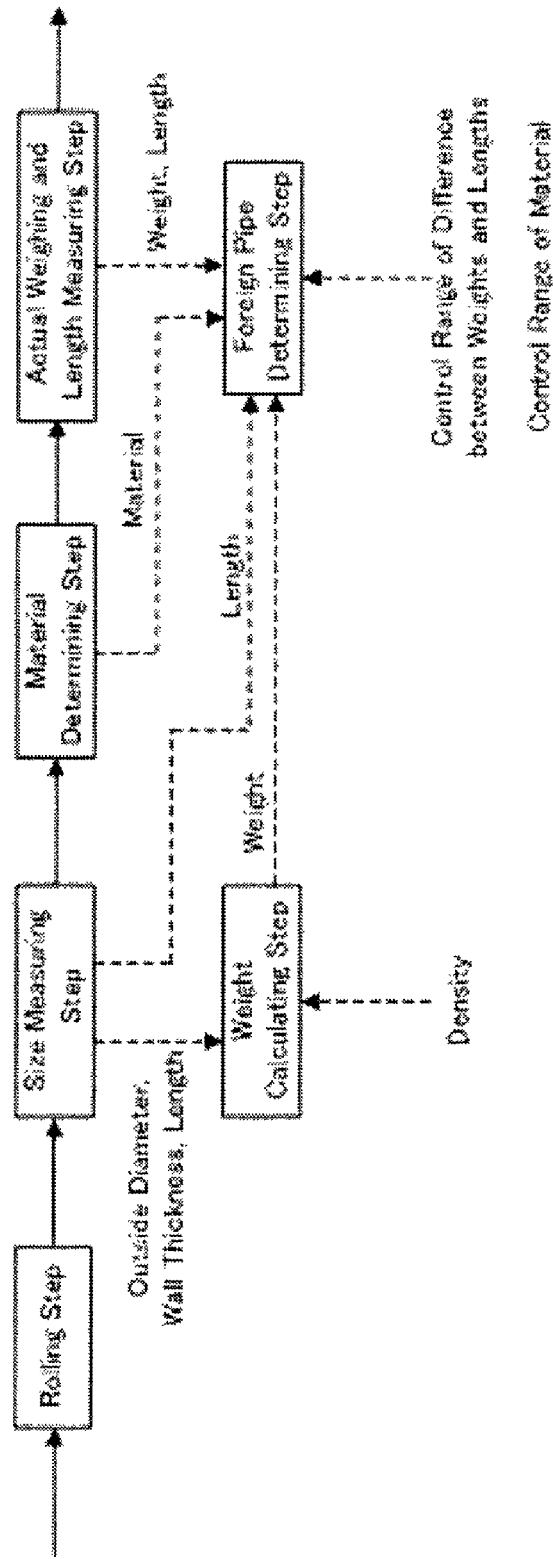
FIG. 1 is a block diagram for explaining the foreign pipe determining method in accordance with the first embodiment of the present invention.

FIG. 1 is a block diagram for explaining the foreign pipe determining method in accordance with the first embodiment of the present invention. In FIG. 1, a solid line with an arrow represents the flow of pipes, and a broken line with an arrow represents the flow of information.

As shown in FIG. 1, in the foreign pipe determining method in accordance with this embodiment, first, in a size measuring step, the outside diameter, wall thickness, and length of pipe are measured for each pipe. The outside diameter, wall thickness, and length of pipe are measured by measuring instruments provided on a pipe conveyance line. Although the kinds of the measuring instruments are not specifically limited, the outside diameter of pipe is measured by, for example, an optical outside diameter meter, the wall thickness of pipe is measured by, for example, an ultrasonic thickness meter, and the length of pipe is measured by, for example, a laser Doppler length measuring system. The measured outside diameter, wall thickness, and length of pipe are entered automatically or by an operator manually into a process computer for controlling the production process of pipe, and are stored therein. At this time, the measured outside diameter, wall thickness, and length of pipe are stored in association with the identifier assigned to the pipe.

Next, in a weight calculating step, the weight of pipe is calculated for each pipe based on the outside diameter, wall thickness, and length of pipe measured in the size measuring step. This weight calculating step is carried out by the process computer. Specifically, the process computer calculates the volume of pipe from the stored outside diameter, wall thickness, and length of pipe, and calculates the weight of the overall length of pipe by multiplying the calculated volume by the density of pipe entered from a host production control system or the like. Alternatively, the process computer calculates the volume per unit length of the pipe from the stored outside diameter and wall thickness of pipe, and calculates the weight per unit length by multiplying the calculated volume by the density of pipe entered from a host production control system or the like. The calculated weight (the weight of the overall length of pipe or the weight per unit length of pipe) is stored in association with the identifier assigned to the pipe.

For the pipe whose outside diameter, wall thickness, and length have been measured in the size measuring step, the material thereof is determined for each pipe in a material determining step. For example, the components contained in the pipe are analyzed by an emission spectrophotometer, although the method for determining the material is not specifically limited. The analysis result is entered into the process computer automatically or by an operator manually and is stored therein. At this time, the analysis result is stored in association with the identifier assigned to the pipe.

Next, for the pipe whose material has been determined in the material determining step, the weight and length thereof are measured for each pipe in an actual weighing and length measuring step. Although the method for measuring the weight and length of pipe is not specifically limited, the weight of pipe is measured by using, for example, a load cell, and the length of pipe is measured by using, for example, a laser Doppler length measuring system, or can be measured by an operator using a measuring tape. The measured weight (the weight of the overall length of pipe or the weight per unit length of pipe) and length of pipe are entered into the process computer automatically or by an operator manually and are stored. At this time, the measured weight and length of pipe are stored in association with the identifier assigned to the pipe.

Finally, in a foreign pipe determining step, the presence of foreign pipe is determined. This foreign pipe determining step is carried out by the process computer. The process computer compares the length of pipe measured in the size measuring step (hereinafter referred to as length L1) with the length of pipe measured in the actual weighing and length measuring step (hereinafter referred to as length L2), which is associated with the pipe in the size measuring step, thereby determining the presence of a foreign pipe. Specifically, the length L1 and the length L2 that have been stored in association with the same identifier are compared with each other, and if the difference between the lengths L1 and L2 is out of the control range entered from the host production control system or the like, it is determined that a foreign pipe coexists in a process between the size measuring step and the actual weighing and length measuring step (that is, the pipes whose lengths have been compared are different ones although the same identifiers are assigned).

Also, the process computer compares the weight of pipe calculated in the weight calculating step (hereinafter referred to as weight W1) with the weight of pipe measured in the actual weighing and length measuring step (hereinafter referred to as weight W2), which is associated with the pipe in the weight calculating step, thereby determining the presence of a foreign pipe. Specifically, the weight W1 and the weight W2 that have been stored in association with the same identifier are compared with each other, and if the difference between the weights W1 and W2 is out of the control range entered from the host production control system or the like, it is determined that a foreign pipe coexists in a process between the size measuring step and the actual weighing and length measuring step (that is, the pipes whose weights have been compared are different ones although the same identifiers are assigned).

Further, the process computer determines the presence of a foreign pipe based on the material of pipe determined in the material determining step. Specifically, if the stored material of pipe (for example, the components contained in the pipe analyzed by the emission spectrophotometer) is out of the control range of the material of pipe (components to be contained in the pipe) entered from the host production control system or the like, it is determined that a foreign pipe coexists.

According to the above-described foreign pipe determining method in accordance with this embodiment, the presence of not only a foreign pipe having a different material but also any kinds of foreign pipes can be determined accurately.

In this embodiment, a mode in which the material determining step is carried out before the actual weighing and length measuring step has been explained. However, the present invention is not limited to this mode. The material determining step can also be carried out after the actual weighing and length measuring step.

Second Embodiment

In the foreign pipe determining method in accordance with a second embodiment, the pipe production process includes a heat treating step between the rolling step and the actual weighing and length measuring step, and a size measuring step is carried out only once after the rolling step and before the heat treating step.

Figure 2:
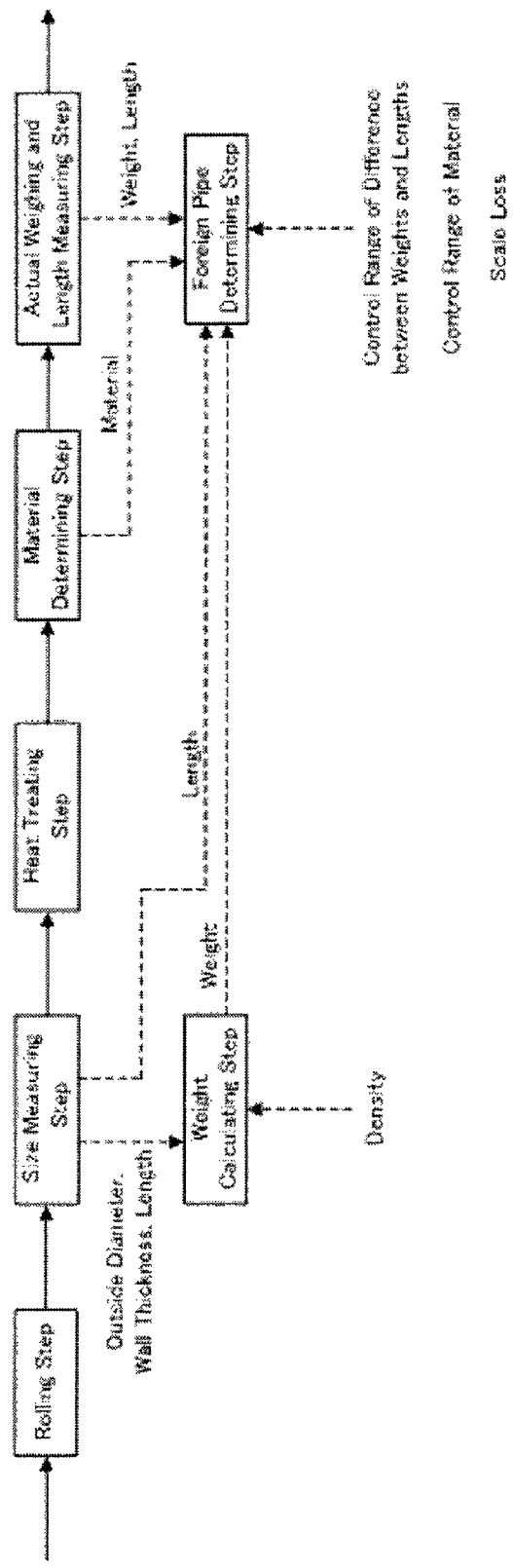
FIG. 2 is a block diagram for explaining the foreign pipe determining method in accordance with the second embodiment of the present invention.

FIG. 2 is a block diagram for explaining the foreign pipe determining method in accordance with the second embodiment of the present invention. In FIG. 2, a solid line with an arrow represents the flow of pipes, and a broken line with an arrow represents the flow of information.

This embodiment differs from the first embodiment in that the heat treating step is included between the size measuring step and the actual weighing and length measuring step as shown in FIG. 2. In the heat treating step, scale is formed on the pipe surface by oxidation, so that the weight of pipe after the heat treating step decreases as compared with the weight of pipe before the heat treating step (scale loss occurs). Therefore, mere comparison between the weight W1 of pipe (the weight of pipe calculated in the weight calculating step) and the weight W2 of pipe (the weight of pipe measured in the actual weighing and length measuring step), which are stored in association with the same identifier may result in the difference between the weights W1 and W2 out of the control range.

Therefore, in this embodiment, in the foreign pipe determining step, the weight W1 and weight W2 of pipe are compared with each other considering the design value of scale loss entered from the host production control system or the like. Specifically, the weight W1 of pipe is compared with the sum of the weight W2 and scale loss, whereby it is determined whether or not the difference between both the values is within the control range. Thereby, as compared with the case where the weight W1 and the weight W2 of pipe are merely compared with each other, improvement in the accuracy of determining a foreign pipe can be expected. Other respects are the same as those in the first embodiment, so that the explanation thereof is omitted.

Third Embodiment

In the foreign pipe determining method in accordance with a third embodiment, the size measuring step and the weight calculating step are carried out a plurality of times for each pipe. Specifically, the pipe production process includes the heat treating step between the rolling step and the actual weighing and length measuring step, a size measuring step is carried out once before and once after the heat treating step, and accordingly, the weight calculating step is also carried out two times.

Figure 3:
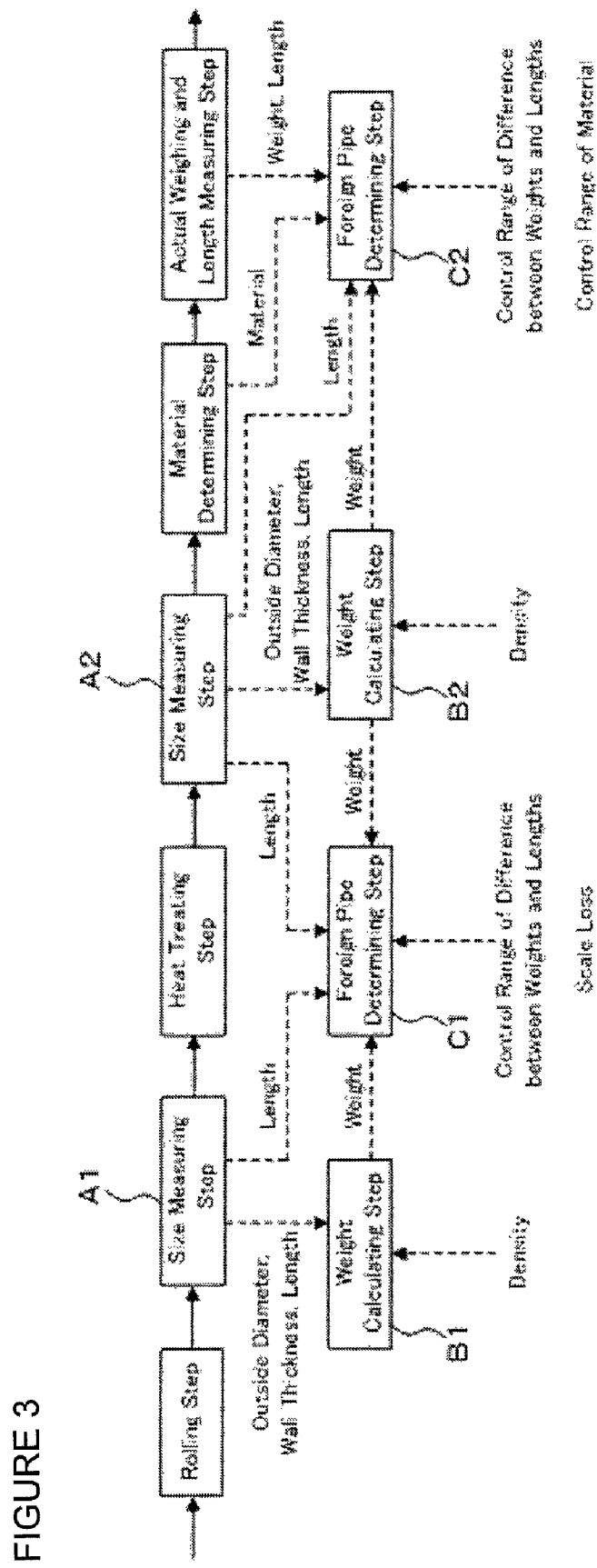
FIG. 3 is a block diagram for explaining the foreign pipe determining method in accordance with the third embodiment of the present invention.

FIG. 3 is a block diagram for explaining the foreign pipe determining method in accordance with the third embodiment of the present invention. In FIG. 3, a solid line with an arrow represents the flow of pipes, and a broken line with an arrow represents the flow of information.

As shown in FIG. 3, in a foreign pipe determining step C2 in this embodiment, as in the foreign pipe determining step in the first embodiment, the length of pipe measured in a size measuring step A2 is compared with the length of pipe measured in the actual weighing and length measuring step, which is associated with the pipe in the size measuring step A2, thereby determining the presence of a foreign pipe. Also, the weight of pipe calculated in a weight calculating step B2 is compared with the weight of pipe measured in the actual weighing and length measuring step, which is associated with the pipe in the weight calculating step B2, thereby determining the presence of a foreign pipe. Further, the presence of a foreign pipe is determined based on the material of pipe determined in the material determining step.

The foreign pipe determining method of this embodiment is characterized in that not only the foreign pipe determining step C2 but also a foreign pipe determining step C1 is carried out. Specifically, in the foreign pipe determining step C1, the length of pipe measured in a preceding size measuring step A1 is compared with the length of pipe measured in the following size measuring step A2, which is associated with the pipe in the preceding size measuring step A1, thereby determining the presence of a foreign pipe. Also, the weight of pipe calculated in a preceding weight calculating step B1 is compared with the weight of pipe calculated in a following weight calculating step B2, which is associated with the pipe in the preceding weight calculating step B1, thereby determining the presence of a foreign pipe. In this comparison, as in the second embodiment, the design value of scale loss entered from the host production control system or the like is considered.

As described above, in the foreign pipe determining method in accordance with this embodiment, the presence of a foreign pipe is not determined by only the comparison with the length and weight of pipe measured in the actual weighing and length measuring step, but the presence of a foreign pipe is determined by the comparison between the lengths of pipe measured in a plurality of size measuring steps A1 and A2 and the comparison between the weights of pipe calculated in a plurality of weight calculating steps B1 and B2. Therefore, the accuracy of determining a foreign pipe can be improved further. Other respects are the same as those in the first embodiment, so that the explanation thereof is omitted.

Fourth Embodiment

In the foreign pipe determining method in accordance with a fourth embodiment, as in the third embodiment, the size measuring step and the weight calculating step are carried out a plurality of times for each pipe. Specifically, the pipe production process includes the heat treating step and a cutting step between the rolling step and the actual weighing and length measuring step, a size measuring step is carried out once before the heat treating step, once between the heat treating step and the cutting step, and once after the cutting step, and accordingly, the weight calculating step is also carried out three times.

Figure 4:
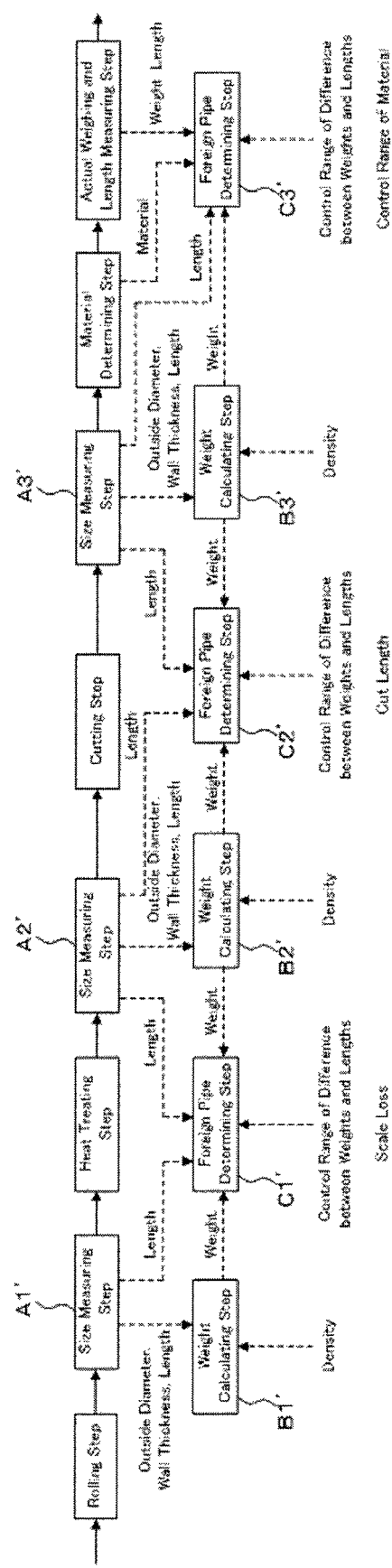
FIG. 4 is a block diagram for explaining the foreign pipe determining method in accordance with the fourth embodiment of the present invention.

FIG. 4 is a block diagram for explaining the foreign pipe determining method in accordance with the fourth embodiment of the present invention. In FIG. 4, a solid line with an arrow represents the flow of pipes, and a broken line with an arrow represents the flow of information.

As shown in FIG. 4, in a foreign pipe determining step C3' in this embodiment, as in the foreign pipe determining step C2 in the third embodiment, the length of pipe measured in a size measuring step A3' is compared with the length of pipe measured in the actual weighing and length measuring step, which is associated with the pipe in the size measuring step A3', thereby determining the presence of a foreign pipe. Also, the weight of pipe calculated in a weight calculating step B3' is compared with the weight of pipe measured in the actual weighing and length measuring step, which is associated with the pipe in the weight calculating step B3', thereby determining the presence of a foreign pipe. Further, the presence of a foreign pipe is determined based on the material of pipe determined in the material determining step.

Also, in a foreign pipe determining step C1' in this embodiment, as in the foreign pipe determining step C1 in the third embodiment, the length of pipe measured in a preceding size measuring step A1' is compared with the length of pipe measured in a following size measuring step A2', which is associated with the pipe in the preceding size measuring step A1', thereby determining the presence of a foreign pipe. Also, the weight of pipe calculated in a preceding weight calculating step B1' is compared with the weight of pipe calculated in a following weight calculating step B2', which is associated with the pipe in the preceding weight calculating step B1', thereby determining the presence of a foreign pipe.

The foreign pipe determining method of this embodiment is characterized in that not only the foreign pipe determining steps C1' and C3' but also a foreign pipe determining step C2' is carried out. Specifically, in the foreign pipe determining step C2', the length of pipe measured in the preceding size measuring step A2' is compared with the length of pipe measured in the following size measuring step A3', which is associated with the pipe in the preceding size measuring step A2', thereby determining the presence of a foreign pipe. The length of pipe cut in the cutting step is entered into the process computer automatically or by an operator manually and is stored. At this time the cut length of pipe is stored in association with the identifier assigned to the pipe. In comparison of the lengths, the stored cut length of pipe is considered. Specifically, the length of pipe measured in the preceding size measuring step A2' is compared with the sum of the length of pipe measured in the following size measuring step A3' and the cut length, whereby it is determined whether or not the difference between both the values is within the control range. Also, the weight of pipe calculated in the preceding weight calculating step B2' is compared with the weight of pipe calculated in the following weight calculating step B3', which is associated with the pipe in the preceding weight calculating step B2', thereby determining the presence of a foreign pipe. In the case where the weight being compared is the weight of the overall length of pipe, the cut length of pipe is considered as in the case where the lengths of pipe are compared.

As described above, in the foreign pipe determining method in accordance with this embodiment, the presence of a foreign pipe is not determined by only the comparison with the length and weight of pipe measured in the actual weighing and length measuring step, but the presence of a foreign pipe is determined by the comparison between the lengths of pipe measured in a plurality of size measuring steps A1' to A3' and the comparison between the weights of pipe calculated in a plurality of weight calculating steps B1' to B3'. Therefore, the accuracy of determining a foreign pipe can be improved further. Other respects are the same as those in the first embodiment, so that the explanation thereof is omitted.

The invention claimed is:

1. A foreign pipe or tube determining method carried out in a pipe or tube production process including a rolling step and an actual weighing and length measuring step for measuring weight and length of each pipe or tube rolled in the rolling step, comprising:
   a size measuring step for measuring outside diameter, wall thickness, and length of each pipe or tube after the rolling step and before the actual weighing and length measuring step;
   a weight calculating step for calculating weight of each pipe or tube based on the outside diameter, wall thickness, and length of pipe or tube measured in the size measuring step;
   a material determining step for determining material of each pipe or tube after the rolling step; and
   a foreign pipe or tube determining step for determining the presence of a foreign pipe or tube, wherein
   the foreign pipe or tube determining step comprises
   a step for determining the presence of a foreign pipe or tube by comparing the length of pipe or tube measured in the size measuring step with the length of pipe or tube measured in the actual weighing and length measuring step, which is associated with the pipe or tube in the size measuring step;
   a step for determining the presence of a foreign pipe or tube by comparing the weight of pipe or tube calculated in the weight calculating step with the weight of pipe or tube measured in the actual weighing and length measuring step, which is associated with the pipe or tube in the weight calculating step; and
   a step for determining the presence of a foreign pipe or tube based on the material of pipe or tube determined in the material determining step.

2. The foreign pipe or tube determining method according to claim 1, wherein
   the size measuring step and the weight calculating step are carried out a plurality of times for each pipe or tube; and
   the foreign pipe or tube determining step further comprises:
   a step for determining the presence of a foreign pipe or tube by comparing the length of pipe or tube measured in the preceding size measuring step with the length of pipe or tube measured in the following size measuring step, which is associated with the pipe or tube in the preceding size measuring step; and
   a step for determining the presence of a foreign pipe or tube by comparing the weight of pipe or tube calculated in the preceding weight calculating step with the weight of pipe or tube calculated in the following weight calculating step, which is associated with the pipe or tube in the preceding weight calculating step.

* * * * *